Oct. 10, 1967 W. G. LAMBERT 3,346,843
PNEUMATIC TIRE BLOW-OUT WARNING APPARATUS
Filed Jan. 14, 1965
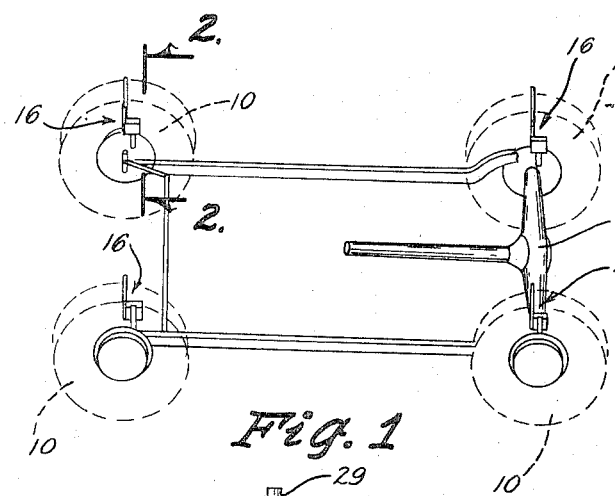
Fig. 1
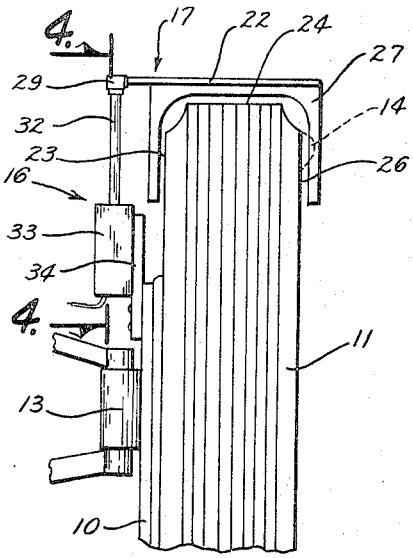
Fig. 2
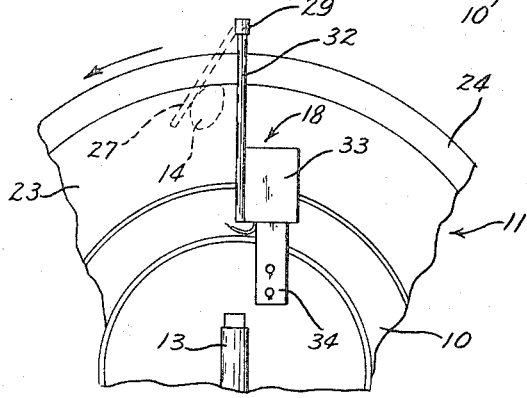
Fig. 3
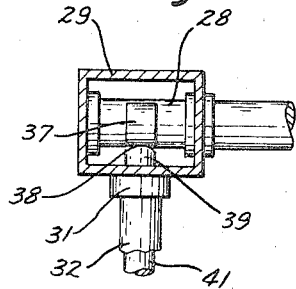
Fig. 5
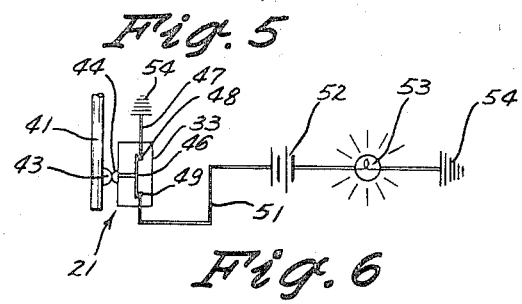
Fig. 4
Fig. 6
INVENTOR
WARREN G. LAMBERT
BY
Robert Henderson
ATTORNEY

United States Patent Office 3,346,843
Patented Oct. 10, 1967

3,346,843
PNEUMATIC TIRE BLOW-OUT WARNING
APPARATUS
Warren G. Lambert, 525 Aspen St.,
Morgantown, W. Va. 26505
Filed Jan. 14, 1965, Ser. No. 425,489
2 Claims. (Cl. 340—58)

This invention relates to an apparatus for warning that a tire or wheel has become unsafe, and more particularly to an apparatus for warning the operator of that which utilizes the tire and wheel that either the tire and/or wheel has attained a dangerous condition which warrants an immediate cessation of rotation of either.

Many safety arrangement systems are known for indicating to an operator of a vehicle or the like that a tire is losing air pressure. These systems usually are responsive through the tire air valve and include complicated electrical and mechanical arrangements. None of these systems, however, warn the operator of the formation on the tire of a small blister which would eventually result in a blow-out of the tire; nor do any of these systems warn the operator of a dangerously out-of-round tire or wobbly wheel.

It is, therefore, an obect of this invention to provide an improved warning apparatus for use with a vehicular wheel and tire unit.

It is another object of this invention to provide an apparatus for warning an operator that a blister or the like has formed on a tire.

Still another object of this invention is the provision of an apparatus for warning an operator that a tire and/or a wheel carrying the tire is rotating in a dangerously wobbly condition.

Yet another object of this invention is to provide an apparatus capable of attaining the objectives designated hereinbefore which is readily attachable to the hub of a vehicular wheel assembly so as to move with the wheel assembly and maintain a constant position relative to the rotating tire, irrespective of the horizontal or vertical position and movement of the tire during use.

Another object of this invention is to provide such an apparatus as designated hereinbefore which is economical to manufacture, extremely simplified in construction and components, and effective in operation.

These objects, and other features and advantages of this invention will become readily apparent upon reference to the following description, when taken in conjunction with the accompanying drawings, wherein:

FIG. 1 is a perspective view of the skeleton framework of a vehicle to which the invention has been attached, the wheel units of the vehicle being shown by dotted lines;

FIG. 2 is an enlarged, fragmentary, elevational view of one tire and wheel assembly, showing the invention attached thereto as seen along the line 2—2 in FIG. 1;

FIG. 3 is a view taken from the left side of FIG. 2, and showing movement of part of the invention by the use of dotted lines;

FIG. 4 is an enlarged sectional view taken along the line 4—4 in FIG. 2, and showing movement of certain parts by the use of dotted lines;

FIG. 5 is a fragmentary, sectional view taken along the line 5—5 in FIG. 4; and

FIG. 6 is a schematic of the electric circuit for the apparatus of this invention.

Referring now to the drawings, a skeleton frame of a vehicle is shown in FIG. 1 including a quartet of vehicle wheels 10 of the usual construction. A pneumatic tire 11 of conventional manufacture is mounted on each wheel 10 in the normal manner, and inflated to the usual pressure. Each wheel 10 at the rear is rotatably mounted on the axle (not shown) within the axle housing 12, and each front wheel 10 is rotatably mounted on the spindle (not shown) of a yoke-type or other axle structure 13 (FIG. 2) again of commercial manufacture.

It is well known that when properly inflated, balanced and manufactured, each wheel 10 and tire 11 rotate as a unit evenly in a vertical or prescribed plane and without any lateral or sidewise wobbling. Should a tire 11 be out-of-round, however, or should a malfunction of any type occur which is connected with the rotation of the wheel 10, wobbling of the wheel and tire out of the vertical plane would occur during rotation. Also, should an imperfection in the tire 11 occur, such as a blister 14 (FIGS. 2 and 3) on either sidewall or tread of the tire, eventually and most probably during use of the tire, the blister 14 will rupture causing a blow-out.

To provide a warning to the operator of the vehicle of the occurrence of either of these dangers, the apparatus of this invention indicated generally at 16 in FIGS. 1 and 2 is provided for each tire 10. As each apparatus 16 is identical, only one will be described. Basically, the apparatus 16 comprises a tire embracing unit 17 (FIG. 2), a unit 18 (FIG. 3) mounting the unit 17 on the wheel 10, an actuating unit 19 (FIG. 4) reciprocally arranged in the mounting unit 18, and an electric switch circuit 21 (see FIG. 6) for signaling the vehicle driver that the tire embracing unit 17 has been struck by the tire or an object stuck thereto.

More particularly, the tire embracing unit 17 includes an elongated, horizontally disposed rod 22 (FIG. 2) extended over the inner sidewall 23 of the tire 10, the tread 24, and the outer sidewall 26. A substantially flat, U-shaped member 27 is secured to the rod 22 and hangs by gravity over the tire 10 as best illustrated in FIG. 2. It can readily be seen that the inner edge of the member 27 is closely spaced laterally from the tire sidewalls 23 and 26 and over the tire tread 24, such that should a blister 14 occur on either sidewall or on the tread, which normally is where ruptures occur, the blister would strike the suspended member 27.

Furthermore, it can readily be appreciated that should the tire be out-of-round or should the wheel wobble on its axle for any reason, both conditions being of sufficient concern to the operator that he should know of their existence, the tire 11 upon rotation would strike the suspended member 27. Additionally, should a foreign object such as a rock or the like become stuck in the tread 24 of the tire 11, it also would strike the suspended member. The actual spacing of the inner edge of the suspended member 27 from the tire 11 is arbitrary, and as will be realized hereinafter, could be adjusted by the operator.

The rod 22 supporting the suspended member 27 is rotatably mounted in a cantilever manner at its inner end 28 (FIG. 5) within an enclosure 29 mounted on the upper end 31 of a tubular housing 32 (FIG. 4). The mounting unit 18 includes both the enclosure 29 and the housing 32, and a switch box 33 and mounting plate 34. The latter is affixed to the inner hub surface of the wheel 10 (FIGS. 2 and 3) whereby the entire apparatus 16 moves with the wheel 10. By this arrangement, the relationship of the suspended member 27 and the peripheral surfaces of the tire 11 are maintained, irrespective of the movement of the tire during use.

Referring to FIGS. 4 and 5, a pair of diametrically opposite cams 36 and 37 are formed on the inner end 28 of the rod 22, which cams 36 and 37 are normally in a horizontal plane when the suspended member 27 is poised in its normal hanging position. In this position of the rod 22, its undersurface 38 (FIG. 4) of the end 28 is engaged by the upper end 39 (FIG. 5) of an actuator shaft 41.

The shaft 41 is a part of the actuating unit 19, which includes also a spring 42. Both the shaft 41 and the spring 42 are mounted as illustrated in the tubular housing 32, with the spring continually biasing the shaft 41 upwardly toward and into constant engagement with the rod end 28. Integral with the shaft 41 is a projection 43 (FIG. 4) which normally is disengaged from a button 44.

The button 44 is part of a conventional push button switch 46 mounted in the switch box 33. Referring to FIG. 6, the switch 46 is shown closing a circuit from a ground lead 47, across the switch terminals 48 and 49, through a lead 51 to a battery 52, such as the vehicle battery, to a lamp 53 visible to the vehicle operator, and to ground 54. When the shaft 41 (FIGS. 4 and 6) has been forced down against the bias of the spring 42, the engagement of the projection 43 with the button 44 closes the switch. Conversely, in the normal non-actuated position of the elements as illustrated in FIG. 4, the projection 43 and the button 44 are not engaged, the switch 46 is open, and the circuit is broken with the lamp 53 de-energized.

In operation, assuming a blister 14 occurring on the outer sidewall 26, upon rotation of the wheel 10 and tire 11, the blister 14 will strike the member 27 and should the tire 11 be rotating in the direction indicated by the arrow in FIG. 3, the member 27 would be swung in the direction shown by dotted lines of the member 27.

The suspended member 27 is therefore swung about a horizontal axis extended transversely and laterally of the tire 11. The member 27 is free to rotate a full 360°, having a radial length such as to normally clear the underside of the vehicle fender (not shown). During the rotation, the cams 36 and 37 spaced 180° apart sequentially engage the shaft 41, forcing it against the spring 42 with each engagement. Each downward movement of the shaft 41 causes the lamp 53 to be energized, and each return movement of the shaft 41 results in a de-energization of the lamp 53.

Thus, the suspended member 27 is responsive to the foreign "object" on the tire or the wobbly wheel, and continues being responsive due to its capability of swinging freely. Likewise, the apparatus 16 reacts by causing the signal lamp 53 to turn on and off. Various other signalling means can of course be envisaged, and the invention is certainly not limited to any particular type.

It is to be noted herein that should it be necessary for the operator to remove the tire 11, and wheel 10 as a part thereof, from the axle, the member 27 can be swung upwardly and held such that the wheel and tire can be removed without causing any dis-assembly of the apparatus 16. As an alternate, however, the outer end of the member 27 which hangs over the outer side wall 26 could be made detachable from the remainder of the member 27; so that, should it be necessary to remove the tire 11 and wheel 10 as a unit, the detachable part of the member 27 could be removed and then re-attached as necessary.

It is believed, in view of the alarming statistical climb of highway accidents involving pneumatic tired vehicles, that various safety measures must be taken. This invention is but one. Every year, nevertheless, human lives are lost through blow-outs and like accidents involving tires and wheels, irregardless of the improvement in automotive tires. The present invention is meant to give the operator and others in a vehicle a warning of even a few seconds or more of a dangerous condition, and thus to give the operator a chance to prevent what could be a serious accident.

Although a preferred embodiment of this invention has been described herein, it is to be remembered that various modifications and alternate constructions can be made thereto without departing from the true spirit and scope of the invention as defined in the appended claims.

I claim:
1. Apparatus for warning an operator of a vehicle having a wheel unit including a pneumatic tire mounted on a wheel of a change in the rotational condition of the wheel unit, the apparatus comprising:
   striker means including a normally stationary member swingably mounted to the tire, said member having an inner edge contiguous to the inner and outer sidewalls and the tread of the tire;
   means attached to the wheel and movable therewith, and swingably supporting said striker means;
   actuator means connected to said attached means and including an element movable in response to a swinging movement of said member; and
   signaling means including a normally de-energized signal device noticeable, when energized, by the operator, said signal means responsive to movement of the element to energize said signal device.

2. Apparatus for warning an operator of a vehicle having a wheel unit including a pneumatic tire mounted on a wheel of a change in the rotational condition of the wheel unit, the apparatus comprising:
   striker means including a member suspended over the tire, said member having an inner edge contiguous to the inner and outer sidewalls and the tread of the tire;
   housing means attached to the wheel and movable therewith, and supporting said member for swinging movement in the direction of rotation of the tire, and for swinging about a 360° circle;
   actuator means connected to said attached means and including a reciprocal element movable in response to a swinging movement of said member; and
   signaling means including a normally de-energized signal device noticeable, when energized, by the operator, said signal means responsive to movement of the element to energize said signal device.

References Cited

UNITED STATES PATENTS 2,213,782  9/1940  Kite _____ 340—58

NEIL C. READ, *Primary Examiner.*

A. H. WARING, *Assistant Examiner.*